(12) United States Patent
Wong et al.

(10) Patent No.: US 6,931,387 B1
(45) Date of Patent: Aug. 16, 2005

(54) METHOD AND SYSTEM FOR ERGONOMIC ASSESSMENT AND REDUCTION OF WORKPLACE INJURIES

(75) Inventors: Robert P. Wong, Huntington, NY (US); Thomas J. Cassar, St. James, NY (US); Cynthia L. Roth, Massapequa, NY (US)

(73) Assignee: Ergonomic Technologies Corporation, Syosset, NY (US)

( * ) Notice: Subject to any disclaimer, the term of this patent is extended or adjusted under 35 U.S.C. 154(b) by 659 days.

(21) Appl. No.: 09/710,488

(22) Filed: Nov. 10, 2000

Related U.S. Application Data

(60) Provisional application No. 60/165,115, filed on Nov. 12, 1999.

(51) Int. Cl.[7] ............................................. G06N 5/00
(52) U.S. Cl. ............................. 706/50; 706/45; 706/40
(58) Field of Search ............................. 706/50, 55, 46, 706/40, 45

(56) References Cited

U.S. PATENT DOCUMENTS

| | | | | |
|---|---|---|---|---|
| 6,101,490 A | * | 8/2000 | Hatton | 706/55 |
| 6,269,356 B1 | * | 7/2001 | Hatton | 706/55 |
| 6,466,928 B1 | * | 10/2002 | Blasko et al. | 706/46 |

OTHER PUBLICATIONS

Kristina Kemmlert, "A method assigned for the identification of ergonomic hazards—PLIBEL," Technical Paper, pp 199-211.

(Continued)

Primary Examiner—Wilbert L. Starks, Jr.
(74) Attorney, Agent, or Firm—Snell & Wilmer L.L.P.

(57) ABSTRACT

A method and system for facilitating resolution of engineering and business issues is provided which comprises an issue component for identifying the issues to be resolved, an inquiry component for facilitating collection of client information relevant to the issue component to facilitate definition of the issue component, a knowledge base comprising data and information for facilitating assessment of the client information; and a solution base for compiling assessments and recommendations from the knowledge base and for reporting the assessments and recommendations to a client. In addition, the system can include a network for communicating the client information to the knowledge base and for communicating the assessments and recommendations to the client. The knowledge base comprises an artificial intelligence engine for assessing the client information, wherein the artificial intelligence engine is configured for comparing the new issue with an existing issue within a database to determine if similar, and thus provide a recommendation associated with the existing issue, and for breaking down the new issue into smaller components for further comparison if the existing issue is not similar to the new issue to thus provide a suggestion associated with said smaller components. As a result, an optimal set of suggestions and recommendations can be provided for a given engineering or business issue or problem. In addition, in accordance with another aspect of the present invention, the above method can be further broken down into smaller elements and sub-elements to provide a more detailed analysis. In addition, the method and system can be suitably utilized to resolve various ergonomic engineering issues.

20 Claims, 9 Drawing Sheets

OTHER PUBLICATIONS

Lynn McAtameny and E. Nigel Corlett, *"RULA: a survey method for the investigation of work-related upper limb disorders,"* Technical Paper, Applied Ergonomics, vol. 24, No. 2, Apr. 1993, pp 91-99.

Asa Kilbom, MD, *"Assessment of physical exposure in relation to work-related musculoskeletal disorders—what information can be obtained from systematic observations?"* Technical Paper, Seand J Work Environ Health 1994, pp 30-45.

D. Colobini, *"An observational method for classifying exposure to repetitive movements of the upper limbs,"* Technical Paper, Ergonomics, 1998, vol. 41, No. 9, pp 1261-1289.

E. Occhipinti, *"OCRA: a concise index for the assessment of exposure to repetitive movements to the upper limbs,"* Technical Paper, Ergonomics, 1998, vol. 41, No. 9, pp 1290-1311.

A. Grieco, *"Application of the concise exposure index (ORCA) to tasks involving repetitive movements of the upper limbs in a variety of manufacturing industries: preliminary validations,"* Technical Paper, Ergonomics, 1998, vol. 41, No. 9, pp. 1347-1356.

Guangyan Li and Peter Buckle, *"Current techniques for assessing physcial exposure to work-related musculosketetal risks, with emphasis on posture-based methods,"* Technical Paper, Ergonomics, 1999, vol. 42, No. 5, pp 674-695.

* cited by examiner

| TASK/ACTION | RIGHT | LEFT | REMOVE |
|---|---|---|---|
| R-1 CUTTING OF LARGE SHELLS | | | |
| GRASP SHELL | | 1 | |
| PLACE SHELL ON LATHE | | 5 | |
| REMOVE WHILE ROTATING SHELL | | 5 | |
| REPLACE SHELL | | 1 | |
| LOWER LEVER | 5 | | |
| RAISE LEVER | 5 | | |
| R-2 CUTTING OF SMALL SHELLS | | | |
| GRASP SHELL | | 1 | |
| PLACE SHELL ON LATHE | | 9 | |
| REMOVE WHILE ROTATING SHELL | | 9 | |

| | |
|---|---|
| 0 | NOTHING AT ALL |
| 0.5 | VERY, VERY WEAK (JUST NOTICEABLE) |
| 1 | VERY WEAK |
| 2 | WEAK (LIGHT) |
| 3 | MODERATE |
| 4 | SOMEWHAT STRONG |
| 5 | STRONG HEAVY |
| 6 | |
| 7 | VERY STRONG |
| 8 | |
| 9 | |
| 10 | VERY, VERY STRONG (ALMOST MAXIMUM) |

FIG.6

SHOULDER POSITIONS AND MOVEMENTS-LEFT SIDE

| | | | | |
|---|---|---|---|---|
| ABDUCTION | ◉ N/A | ▫ 1/3 | ▫ 2/3 | ▫ 3/3 |
| FLEXION | ◉ N/A | ▫ 1/3 | ▫ 2/3 | ▫ 3/3 |
| EXTENSION | ◉ N/A | ▫ 1/3 | ▫ 2/3 | ▫ 3/3 |

☐ PERFORMS WORK GESTURES OF THE SAME TYPE INVOLVING THE SHOULDER FOR MORE THAN 50% OF THE CYCLE/TASK TIME?

☐ KEEPS THE ARM RAISED (UNSUPPORTED) BY AN ANGLE MORE THAN 60 DEGREES OR IN EXTENSION FOR AT LEAST 10 SEC. CONSECUTIVELY ONCE EVERY CYCLE (SHORT CYCLE). FOR LONGER CYCLE TIME INCREASE PROPORTIONATELY THE TIME OF THE STATIC CONTRACTION.

☐ KEEPS THE ARM RAISED (UNSUPPORTED) AT 60 DEGREES FOR >1 MINUTE ▽

SHOULDER POSITIONS AND MOVEMENTS-RIGHT SIDE

| | | | | |
|---|---|---|---|---|
| ABDUCTION | ◉ N/A | ▫ 1/3 | ▫ 2/3 | ▫ 3/3 |
| FLEXION | ◉ N/A | ▫ 1/3 | ▫ 2/3 | ▫ 3/3 |
| EXTENSION | ◉ N/A | ▫ 1/3 | ▫ 2/3 | ▫ 3/3 |

☐ PERFORMS WORK GESTURES OF THE SAME TYPE INVOLVING THE SHOULDER FOR MORE THAN 50% OF THE CYCLE/TASK TIME?

☐ KEEPS THE ARM RAISED (UNSUPPORTED) BY AN ANGLE MORE THAN 60 DEGREES OR IN EXTENSION FOR AT LEAST 10 SEC. CONSECUTIVELY ONCE EVERY CYCLE (SHORT CYCLE). FOR LONGER CYCLE TIME INCREASE PROPORTIONATELY THE TIME OF THE STATIC CONTRACTION.

☐ KEEPS THE ARM RAISED (UNSUPPORTED) AT 60 DEGREES FOR >1 MINUTE ▽

ABDUCTION   FLEXION   EXTENSION

ELBOW MOVEMENTS-LEFT SIDE

| | | | | |
|---|---|---|---|---|
| SUPINATION | ◉ N/A | ▫ 1/3 | ▫ 2/3 | ▫ 3/3 |
| PRONATION | ◉ N/A | ▫ 1/3 | ▫ 2/3 | ▫ 3/3 |
| FLEXION | ◉ N/A | ▫ 1/3 | ▫ 2/3 | ▫ 3/3 |

☐ PERFORMS WORK GESTURES OF THE SAME TYPE INVOLVING THE ELBOW FOR MORE THAN 50% OF THE CYCLE?

ELBOW MOVEMENTS-RIGHT SIDE

| | | | | |
|---|---|---|---|---|
| SUPINATION | ◉ N/A | ▫ 1/3 | ▫ 2/3 | ▫ 3/3 |
| PRONATION | ◉ N/A | ▫ 1/3 | ▫ 2/3 | ▫ 3/3 |
| FLEXION | ◉ N/A | ▫ 1/3 | ▫ 2/3 | ▫ 3/3 |

☐ PERFORMS WORK GESTURES OF THE SAME TYPE INVOLVING THE ELBOW FOR MORE THAN 50% OF THE CYCLE?

SUPINATION/PRONATION   FLEXION

FIG.8A

| WRIST POSITIONS AND MOVEMENTS-LEFT SIDE | | | | | WRIST POSITIONS AND MOVEMENTS-RIGHT SIDE | | | | |
|---|---|---|---|---|---|---|---|---|---|
| EXTENSION | ⊙ N/A | ☐ 1/3 | ☐ 2/3 | ☐ 3/3 | EXTENSION | ⊙ N/A | ☐ 1/3 | ☐ 2/3 | ☐ 3/3 |
| FLEXION | ⊙ N/A | ☐ 1/3 | ☐ 2/3 | ☐ 3/3 | FLEXION | ⊙ N/A | ☐ 1/3 | ☐ 2/3 | ☐ 3/3 |
| RADIAL DEVIATION | ⊙ N/A | ☐ 1/3 | ☐ 2/3 | ☐ 3/3 | RADIAL DEVIATION | ⊙ N/A | ☐ 1/3 | ☐ 2/3 | ☐ 3/3 |
| ULNAR DEVIATION | ⊙ N/A | ☐ 1/3 | ☐ 2/3 | ☐ 3/3 | ULNAR DEVIATION | ⊙ N/A | ☐ 1/3 | ☐ 2/3 | ☐ 3/3 |

☐ PERFORMS WORK GESTURES OF THE SAME TYPE INVOLVING THE WRIST FOR MORE THAN 50% OF THE CYCLE?

☐ PERFORMS WORK GESTURES OF THE SAME TYPE INVOLVING THE WRIST FOR MORE THAN 50% OF THE CYCLE?

EXTENSION/FLEXION  RADIAL/ULNAR

TYPE OF GRIP AND FINGER MOVEMENTS-LEFT SIDE

TYPE OF GRIP AND FINGER MOVEMENTS-RIGHT SIDE

| TIGHT GRIP (1.5CM) | ⊙ N/A | ☐ 1/3 | ☐ 2/3 | ☐ 3/3 | TIGHT GRIP (1.5CM) | ⊙ N/A | ☐ 1/3 | ☐ 2/3 | ☐ 3/3 |
|---|---|---|---|---|---|---|---|---|---|
| PINCH | ⊙ N/A | ☐ 1/3 | ☐ 2/3 | ☐ 3/3 | PINCH | ⊙ N/A | ☐ 1/3 | ☐ 2/3 | ☐ 3/3 |
| PALMAR GRIP | ⊙ N/A | ☐ 1/3 | ☐ 2/3 | ☐ 3/3 | PALMAR GRIP | ⊙ N/A | ☐ 1/3 | ☐ 2/3 | ☐ 3/3 |
| HOOK GRIP | ⊙ N/A | ☐ 1/3 | ☐ 2/3 | ☐ 3/3 | HOOK GRIP | ⊙ N/A | ☐ 1/3 | ☐ 2/3 | ☐ 3/3 |
| KEYING GRIP | ⊙ N/A | ☐ 1/3 | ☐ 2/3 | ☐ 3/3 | KEYING GRIP | ⊙ N/A | ☐ 1/3 | ☐ 2/3 | ☐ 3/3 |
| WIDE GRIP (4-5CM) | ⊙ N/A | ☐ 1/3 | ☐ 2/3 | ☐ 3/3 | WIDE GRIP (4-5CM) | ⊙ N/A | ☐ 1/3 | ☐ 2/3 | ☐ 3/3 |

☐ PERFORMS WORK GESTURES OF THE SAME TYPE INVOLVING THE SAME FINGER(S) FOR AT LEAST 50% OF THE CYCLE?

☐ PERFORMS WORK GESTURES OF THE SAME TYPE INVOLVING THE SAME FINGER(S) FOR AT LEAST 50% OF THE CYCLE?

☐ HOLDS AND OBJECT IN A PINCH, PALMAR OR HOOK GRIP FOR AT LEAST 50% OF CYCLE?

☐ HOLDS AND OBJECT IN A PINCH, PALMAR OR HOOK GRIP FOR AT LEAST 50% OF CYCLE?

FIG.8B

METHOD AND SYSTEM FOR ERGONOMIC ASSESSMENT AND REDUCTION OF WORKPLACE INJURIES

CROSS-REFERENCE TO RELATED APPLICATIONS

This application claims priority of prior-pending U.S. Provisional Patent Application No. 60/165,115, filed Nov. 12, 1999, and entitled, METHOD AND SYSTEM FOR WORKPLACE JOB ASSESSMENT, which is hereby incorporated by reference herein.

FIELD OF THE INVENTION

The present invention relates to a method and system for providing assessment and solutions to engineering and business problems. More particularly, the present invention relates to a method and a system for facilitating solutions for engineering and business problems through automation of information identification, assessment and analysis of the problems.

BACKGROUND OF THE INVENTION

The available resources for solving various industrial, manufacturing, engineering or business problems are often limited by the few products and services available to efficiently, accurately, and cost-effectively monitor, analyze, and solve those problems. In most instances, the knowledge for resolving these problems is readily available, however, access to this knowledge is limited. For example, the availability of problem solving functions are often limited by the lack of available human capital to perform the in-depth analysis necessary to resolve such problems. In addition, the problems associated with industrial, manufacturing, engineering and business operations are often complex. For many types of complex problems more than one solution to the problem exist due to the complex relationship among the variables, factors and elements of the problem. Thus, complex problem solving often requires even more resources than more simple problems, such as those occurring around the common household.

In resolving the various business problems, generally a first step comprises identification of a "problem" or "issue", which comprises a question or inquiry proposed for solution, decision or determination, such as any industrial, manufacturing, engineering or business problem or issue that one desires to resolve. For example, problems could include the need to increase the productivity on a manufacturing line, the need to conduct a valuation of facilities or property prior to sale or acquisition of the facilities or property, or the need to reduce the ergonomic, safety and health risks and injuries in the workplace.

Upon identification of a problem, information relating to, or defining, the problem generally needs to be collected to facilitate analysis and assessment of the information. This information is typically collected by the company at the request of various engineering or business consultants and experts, or collected directly by those consultants or experts. This information can include a wide variety of data, statistics, measurements and other like information relating to the problem to be assessed or analyzed. Further, the level of detail of the information can comprise various levels, such as low level information, for example, the number of devices to be manufactured, the number of hours of an employee on the job, or the number of rooms in a building, or high level information, such as the particular number of manufacturing delays resulting from operator error, the average price per square foot of like-sized building in the area, or the frequency and duration of particular arm movements of an employee within a given work shift.

Having collected and obtained various types and amounts of information relating to a problem, an analysis and assessment of the information can be conducted by the various engineering and business consultants, experts and the like who have developed a knowledge base relevant to the given problem or issue. Based on that knowledge base, various levels of analysis and assessment can be provided, such as a generalized analysis and assessment or a very detailed analysis and assessment which produces specific suggestions and recommendations tailored to addressing specific risks or factors, as well as the ability to predict costs and performance results from enacting the recommendations.

However, facilitating this issue identification, information collecting and assessment process can be a problem for many companies. For example, while many companies may have some internal staffing and the internal resources to learn the requisite knowledge to resolve many of these problems and issues internally, this learning process generally takes too much time. Companies may also attempt to develop their own knowledge base for resolving the problems and issues, however, these efforts often result in "re-inventing the wheel" in which the resulting development costs and time for development are greater than the option of hiring a consultant or expert. While obtaining the assistance of consultants and experts can reduce this time period, the associated costs in bringing a staff or group of consultants to collect information and analyze and assess the issues at the companies operations can be still be quite costly, and the availability of these consultants and experts is often less than the number of problems and issues needing resolved.

One area where the need to resolve engineering issues is increasing is in the field of ergonomics. Corporations are currently spending over $60 billion annually for compensable injuries in every type of work environment. Ergonomics awareness is increasing with rising illness and injury trends, an aging work force, more women in the work environment and large percentages of the work force being affected by cumulative trauma disorders (CTD) type injuries. These CTD type injuries are typically due to inadequately designed workstations, processes, equipment and tools. When designing a manufacturing process, very little attention is often paid to the workers' accommodation and environment based on the job requirements. This lack of job design knowledge is displayed in the injury/illness rates for workers' compensation claims, lost work time, quality issues and product liability claims.

The labor force in the U.S. is projected to increase by 15 million over the 1996–2006 period, from 134 million to 149 million, an increase of 11%. In addition to a growing workforce, the injury rates could increase over the next five years due to an aging working population and the addition of more women entering the workforce as both groups can often be more susceptible to injury and lost work time in the work environment. As an example of the need for ergonomic intervention when designing jobs, tools, workstations and equipment, it is expected that 48% of the employees in the U.S. by the year 2005 will be women. (Bureau of Labor Statistics, 1995). Further, it is expected that the U.S. labor force age group 45–64 years of age will grow faster than the labor force of any other age group as the baby-boom generation continues to age. As a result, the increase in the average age of the working population and the number of women entering the workforce precipitates the need for ergonomic engineering related services in many countries, including Japan. These expected problems reflect the need for ergonomic engineering services and products to assist global companies in reducing costs.

In addition, ergonomics is also receiving renewed attention in the workplace as companies and government realize its impact on productivity and worker safety and health. For example, on Feb. 19, 1999, the Occupational Safety and Health Administration (OSHA) announced the publishing of a draft ergonomic standard that requires companies to perform an ergonomic workplace analysis after the occurrence of even a single cumulative trauma injury. Further, many companies have started their own ergonomic initiatives independent of government regulations to realize the cost savings and productivity gains associated with a health workforce.

As a result of the foregoing, the total market for ergonomic services and analysis products is expected to grow rapidly fueled by the growth in ergonomic awareness, government regulations, and gains in productivity realized from the reduction in workplace injuries. Unfortunately, there are few products and services available to efficiently, accurately, and cost-effectively monitor, analyze, and solve problems relating to the workplace and resulting products. Moreover, since these cumulative trauma disorder (CTD) type injuries are not single event oriented, the simple monitoring of such past events can not provide a very effective means for reducing and preventing these type of injuries.

Accordingly, a need exists for an improved method and system for assessing and resolving various engineering and business solutions that overcomes the problems described above. In addition, a need exist for a method and system to reduce and prevent not only single event-type accidents and injuries in the workplace, but also these cumulative trauma disorder (CTD) type injuries.

SUMMARY OF THE INVENTION

A method and system according to the present invention addresses many of the shortcomings of the prior art. In accordance with one aspect of the invention, a system for facilitating resolution of engineering and business issues is provided comprising an issue component for identifying the issues to be resolved, an inquiry component for facilitating collection of client information relevant to the issue component to facilitate definition of the issue component, a knowledge base comprising data and information for facilitating assessment of the client information; and a solution base for compiling assessments and recommendations from the knowledge base and for reporting the assessments and recommendations to a client. In addition, the system can include a network for communicating the client information to the knowledge base and for communicating the assessments and recommendations to the client.

In accordance with another aspect of the invention, the knowledge base comprises an artificial intelligence engine for assessing the client information, wherein the artificial intelligence engine is configured for comparing the new issue with an existing issue within a database to determine if similar, and thus provide a recommendation associated with the existing issue, and for breaking down the new issue into smaller components for further comparison if the existing issue is not similar to the new issue to thus provide a suggestion associated with said smaller components. As a result, an optimal set of suggestions and recommendations can be provided for a given engineering or business issue or problem. In addition, in accordance with another aspect of the present invention, the above method can be further broken down into smaller elements and sub-elements to provide a more detailed analysis.

In accordance with an exemplary embodiment, the above system and method can be suitably utilized to resolve various ergonomic engineering issues. In accordance with this embodiment, a method for reducing ergonomic injuries in the workplace comprising the steps of identifying an ergonomic issue occurring at a client operation, collecting information relevant to the ergonomic issue, assessing the information collected to provide recommendations for resolving the ergonomic issue, and providing the recommendations to a client, wherein the step of assessing comprises using an artificial intelligence engine, such as the artificial engine described above to provide the recommendations.

BRIEF DESCRIPTION OF THE DRAWING

A more complete understanding of the present invention may be derived by referring to the detailed description when considered in connection with the figures, where:

FIG. 6 is a block diagram of an exemplary embodiment of an exertion scale in accordance with the present invention;

FIGS. 8A and 8B are illustrations of exemplary displays for facilitating collection of information;

DETAILED DESCRIPTION OF EXEMPLARY EMBODIMENT

The present invention may be described herein in terms of various software modules and processing steps. It should be appreciated that such modules and steps may be realized by any number of hardware components configured to perform the specified functions. For example, the present invention may employ various input/output devices, data storage and memory devices, buffers, terminals, and the like, which may carry out a variety of functions under the control of one or more microprocessors or other control devices. In addition, those skilled in the art will appreciate that the present invention may be practiced in any number of engineering and business contexts and that the exemplary embodiment relating to ergonomics in the workplace as described herein is merely one exemplary application for the invention. For example, the principles, features and methods discussed may be applied to any general health and safety application within a workplace. Further, various aspects of the present invention may be suitably applied to other industrial, manufacturing or engineering problem solving applications.

As discussed above, the available resources for solving various industrial, manufacturing or engineering problems and issues are often limited by the few products and services available to efficiently, accurately, and cost-effectively monitor, analyze, and solve those problems, including the limited access to various consultants and experts and thus to their inherent knowledge base. However, to address the need for improved problem assessment and solving techniques, a method and system has been developed in accordance with the present invention which overcomes the limitations described above.

Figure 1:
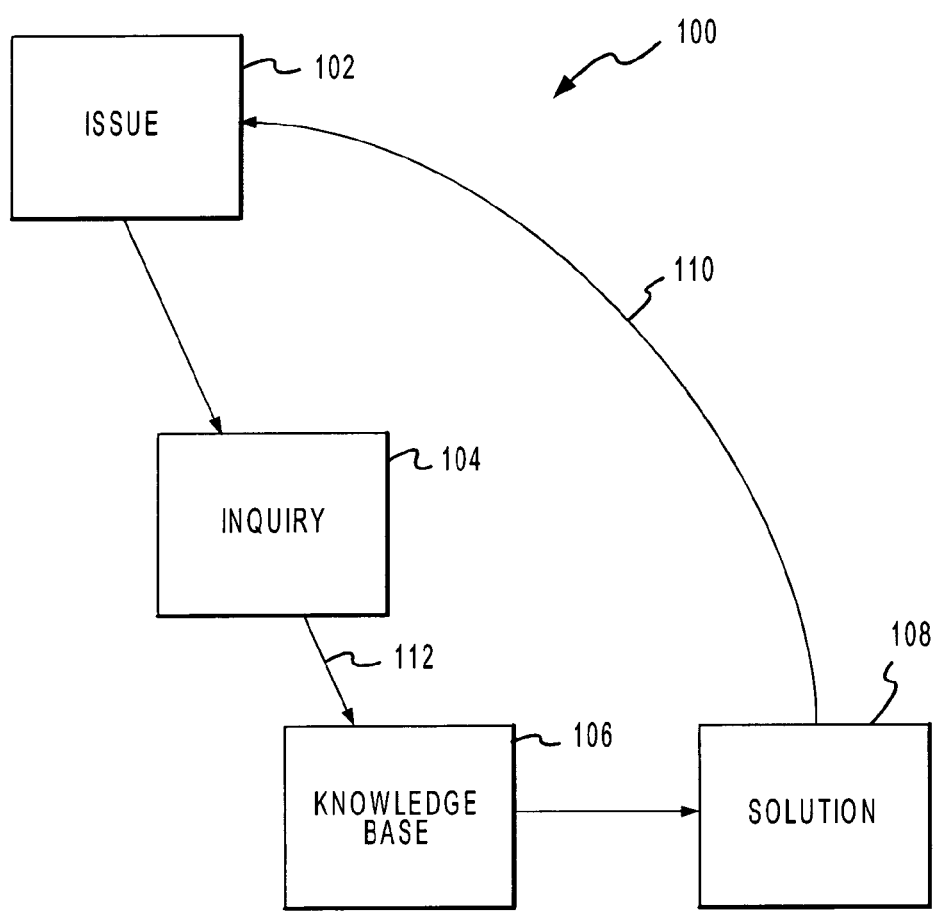
FIG. 1 is a block diagram representation of an exemplary system for problem assessment in accordance with the present invention.

With reference to FIG. 1, in accordance with the present invention, an exemplary method and system 100 for facilitating resolution of engineering and business problems and issues is illustrated. System 100 comprises an issue component 102, an inquiry component 104, a knowledge base 106 and a solution base 108. Issue component 102 comprises the statement of a problem or issue. Issue component 102 can comprise any problem or issue providing a question proposed for solution, decision or determination, such as any industrial, manufacturing, engineering or business problem or issue that one desires to resolve. Inquiry component 104 comprises the inquiry made by a company to access knowledge base 106, such as an inquiry from the company to a consultant or expert, or from the consultant to the company, to identify the issue or problem and thus collect relevant information to further define the problem as well as facilitate a solution 108. Thus, a function of inquiry component 104 is to facilitate the extraction of information from the company to facilitate analysis and assessment of that information and evaluation of knowledge base 106.

In addition, inquiry component 104 can be conducted in various manners, including, for example, direct questioning by consultants or experts, or the completion of questionnaires or other like methodologies for information collecting. This information can also be transmitted 112 from the company to the consultant or expert in various manners, such as by direct discussion, by written correspondence, or by way of network communications, such as through an IP network.

Once the information is collected through inquiry component 104, the information can be suitably assessed and evaluated through use of knowledge base 106. Knowledge base 106 suitably comprises the wealth of information, data, knowledge and the like that facilitates the development of solutions 108 corresponding to the various issues and problems 102. Knowledge base 106 comprises an ongoing compilation of information as provided by various consultants and experts, such as previous personal experiences, by referral to specific files and case databases, or through the analysis and results of prior cases for resolving problems and issues. In addition, the knowledge base 106 is adaptable, such as by the continuing interrogation of information and assessment of cases. Thus, from the information collected in inquiry component 104, and the information contained in knowledge base 106, an assessment can be conducted to provide one or more solutions 108.

The assessment process comprises the determination of the rate or amount of a component within the collection of facts, such as the level of risk, or rate of productivity. In addition, the assessment process comprises the examination of a complex problem, its related elements and their relationship together or with other problems and elements. The assessment process can be conducted in various manners, for example, by manual review and analysis by engineers, technicians or managers and the like through use of knowledge base 106. In addition, the assessment process can be facilitated by the use of automated devices, including computers and microprocessors and the like. Further, such automated features can be facilitated by the use of various artificial intelligence (AI) techniques to provide a high-level, mid-level or detailed assessment of the problem.

Upon assessment and analysis of the information collected from inquiry component 104 and knowledge base 106, various recommendations and solutions in solution base 108 can be provided to the company or requester by way of transmission 110. Solution base 108 can comprise various levels of recommendations, such as general recommendations, prioritization recommendations, or specific recommendations, including various sets of suggestions. In addition, solution base 108 can be transmitted 110 by various methods, such as by direct verbal communication or written communication by way of telecommunications or mailing correspondence, or by way of network communications, such as through an IP network.

One such area where the above invention is very suitable is within the ergonomic engineering industry. As discussed above, the demand for ergonomic assessments is increasing ever-rapidly. However, with respect to most companies, there is a lack of basic understanding of general ergonomic principles to facilitate resolution of many of their ergonomic problems and issues. While many of these issues can be readily resolved by current knowledge bases, access to that knowledge is most often limited. In addition, many ergonomic issues that arise in industry may not be able to be suitably resolved through use of present day knowledge bases. For example, most knowledge bases have been developed for working groups comprising mainly middle-aged men; as a result of the increase of older working groups and women entering the workforce, these knowledge bases may prove to be insufficient. Moreover, the time to update and improve these existing knowledge bases is short, due to the immediate need for more reliable information.

Figure 2:
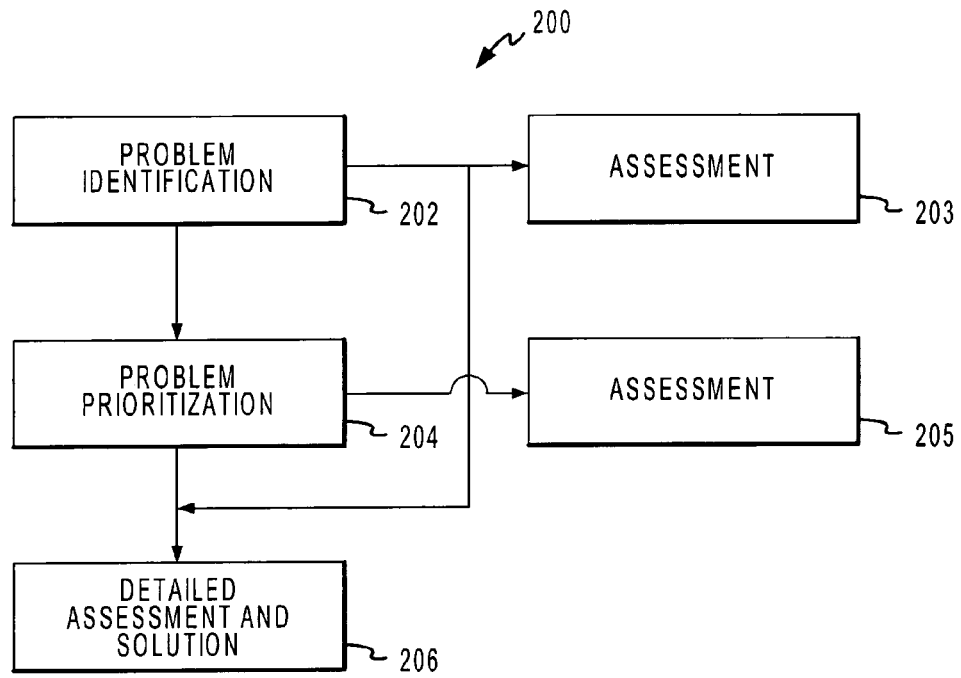
FIG. 2 is a block diagram representation of an exemplary method for problem assessment in accordance with the present invention.

Thus, to facilitate a more detailed discussion of various aspects of the present invention, an exemplary embodiment of a method as applied to an ergonomic application for reducing ergonomic related injuries in the workplace will be described in accordance with the present invention. With reference to FIG. 2, an exemplary method 200 comprises a problem identification step 202 and an assessment step 203. While various methodologies can be utilized for step 202, in accordance with the exemplary embodiment, the PLIBEL methodology, for example as referenced in "A Method Assigned for the Identification of Ergonomic Hazards", Kristina Kemmlert, National Institute of Occupational Health, can be suitably incorporated.

In identification step 202, the collection of data and information relating to the problem or problems within a particular case is conducted. This collection of information can be facilitated by a checklist of questions configured for identifying the problem and addressing the most prevailing hazards and risks typically dominant in the workplace. For example, the checklist can be designed to test an industrial job for various typical ergonomic hazards. The questions available from such a checklist can relate to workspace, movement and effort to determine high-level risks that may be encountered in the workplace, such as questions directed to the effect or impact on the neck, shoulders, elbows, forearms, hands, feet, knees, hips and lower back. For example, the questions could inquire into whether any tools or equipment are unsuitably designed for the worker or for the task, whether the working height of workspace elements, such as tables, desks or chairs, are adjusted properly, and whether fatiguing foot-pedal or hand-lever operating work is performed. Other like high-level questions obvious to one skilled in the art can also be included within identification step 202. In addition, the questions can be configured for single answers, or for multi-part answers. Moreover, the collection of information is not limited to a checklist, but instead can comprise any method or system for collecting or identifying information and data relating to a problem or set of problems.

Upon completion of identification step 202, assessment step 203 can be suitably provided. In this regard, step 203 can comprise a simple recap of the information collected in step 202 and can provide a series of high-level recommendations to the end user, such as may be available from a database of cases of previously analyzed problems. In addition, the recommendations can be facilitated by an artificial intelligence (AI) search engine. Further, in accordance with an exemplary embodiment for assessment step 203, the various ergonomic risks can be suitably identified for each defined body area identified in step 202 and listed or displayed for the system end user.

As discussed, these high-level recommendations can be provided from an artificial intelligence (AI) search engine. In accordance with an exemplary embodiment, a rules-based AI engine is suitably incorporated. The rule-based AI engine comprises a deterministic approach which provides an algorithm based on a series of chained rules that suitably define a solution based on the questions answered in step 202. Thus, as various of the responses to the questions are identified, the series of chain rules can be suitably applied to provide high-level recommendations. These recommendations can relate to various categories of solutions, for example, product recommendations, administrative recommendations, and engineering recommendations. While these recommendations may not be the optimal solutions to a given problem, these recommendations comprise appropriate solutions based on the amount and type of information collected in step 202. As a result, the end user can quickly and efficiently obtain plausible solutions to a given problem.

In the event that the end user requires a greater level of solution to a given problem, or a more optimized or quantified solution, for example, in accordance with another exemplary embodiment, method 200 comprises an identification step 202, a prioritization step 204 and an assessment 205. In accordance with this embodiment, a more detailed prioritization of ergonomic risks that can result in injury in the industrial workplace is provided. This more detailed prioritization can be realized, for example, by the examination of zones of motion for the employee, as well as the force and effort exerted during these motions, to provide an assessment of the danger level that is indicative of changes needed in the ergonomic program. This assessment of the danger level can comprise a numerical ranking of the severity of the ergonomic risks on the individual.

Continuing in accordance with this embodiment, identification step 202 comprises a more detailed collection of information than provided under the high level assessment described above. Thus, in addition to the high-level information, identification step 202 can suitably request detailed measurements to be taken for the individual and the surrounding ergonomic environment. For example, detailed information surrounding the zone of motion for the arms, wrists, neck, trunk and legs can be collected.

To facilitate the collection of such detailed information, identification step 202 can include graphical displays that represent various movement ranges. For example, with reference to FIG. 7, an exemplary graphical display for various upper arm movements is illustrated. Through use of a display configured for a particular body part, such as the arms, wrists or legs, the end user can suitably select a displayed range of motion which best represents the end user's work environment. Such an inquiry into the selection of a suitable range of motion can be conducted for various of the body areas, and for each side of the body. In addition, preliminary information regarding the force and exertion can also be collected for the various body areas.

In accordance with another exemplary embodiment, an optional section inquiring into lower back problems can also be suitably included. For example, if an individual is involved in lifting activities in the workplace, the end user can be presented with graphical displays depicting the type of lift, including an inquiry into the weight of the item and the distance from the body of the item being lifted.

Upon completing the more detailed identification step 202, a prioritization step 204 is suitably configured to provide a broad scale measurement of the likely exposure to various ergonomic risks and provide likely outcomes from various suggested actions to be offered in assessment 205. To facilitate the broad scale measurement and assessment, prioritization step 204 suitably includes the use of mathematical calculations. In accordance with this aspect of the present invention, for each response to the inquiries of range of motion for various body parts, a corresponding point value is suitably assigned. In addition, these corresponding point values can also be suitably scaled and/or adjusted by information collected regarding force and exertion data for those body parts. After obtaining the corresponding adjusted values for the given body parts, including both sides of the body, the values can be suitably compared to determine the potential exposure levels. For example, the values can be suitably plotted in a matrix configuration to provide an exposure index value or rating. These corresponding adjusted values can also be evaluated by other known methodologies, such as regression analysis and the like, to provide a exposure rating that corresponds to an appropriate action level suitable for recommendation to the end user in assessment 205.

In addition to the mathematical calculations above, the more detailed collected information can also be suitably provided to an AI engine, such as the rule-based AI engine described above. Thus, as various of the responses to the questions are identified, the series of chain rules can be suitably applied to provide mid-level recommendations, such as, for example, product recommendations, administrative recommendations, and engineering recommendations in assessment 205. While these recommendations may not be the optimal solutions to a given problem, these recommendations comprise more detailed solutions based on the amount of additional detailed information collected in step 202. As a result, the end user can quickly and efficiently obtain plausible solutions to a given problem.

In the event that the end user requires an even greater level of solution to a given problem, for example, a more optimized problem, in accordance with another exemplary embodiment, method 200 comprises an identification step 202 and a detailed risk assessment and solution step 206. In accordance with this exemplary embodiment, a more detailed and concise assessment of ergonomic risks and impacts that can result in injury in the industrial workplace is provided. In addition to the information and assessments obtained above, this exemplary embodiment provides a more concise index for determination of ergonomic stress in the various body parts resulting from repetitive motion over time. In addition, an analysis can be suitably conducted based on a comparison between the actual amount of work performed during an employee's work shift and a recommended amount of work to be done for the same work shift. Although various methodologies for making such a comparison can be utilized, as well as various methodologies for the assessment of exposure to repetitive movements of various body parts, a OCRA methodology is preferably utilized. Further, while various AI engine methodologies can be utilized, in accordance with a preferred embodiment, an improved artificial intelligence engine is implemented to analyze the detailed data and provide recommended solutions.

Figure 5:
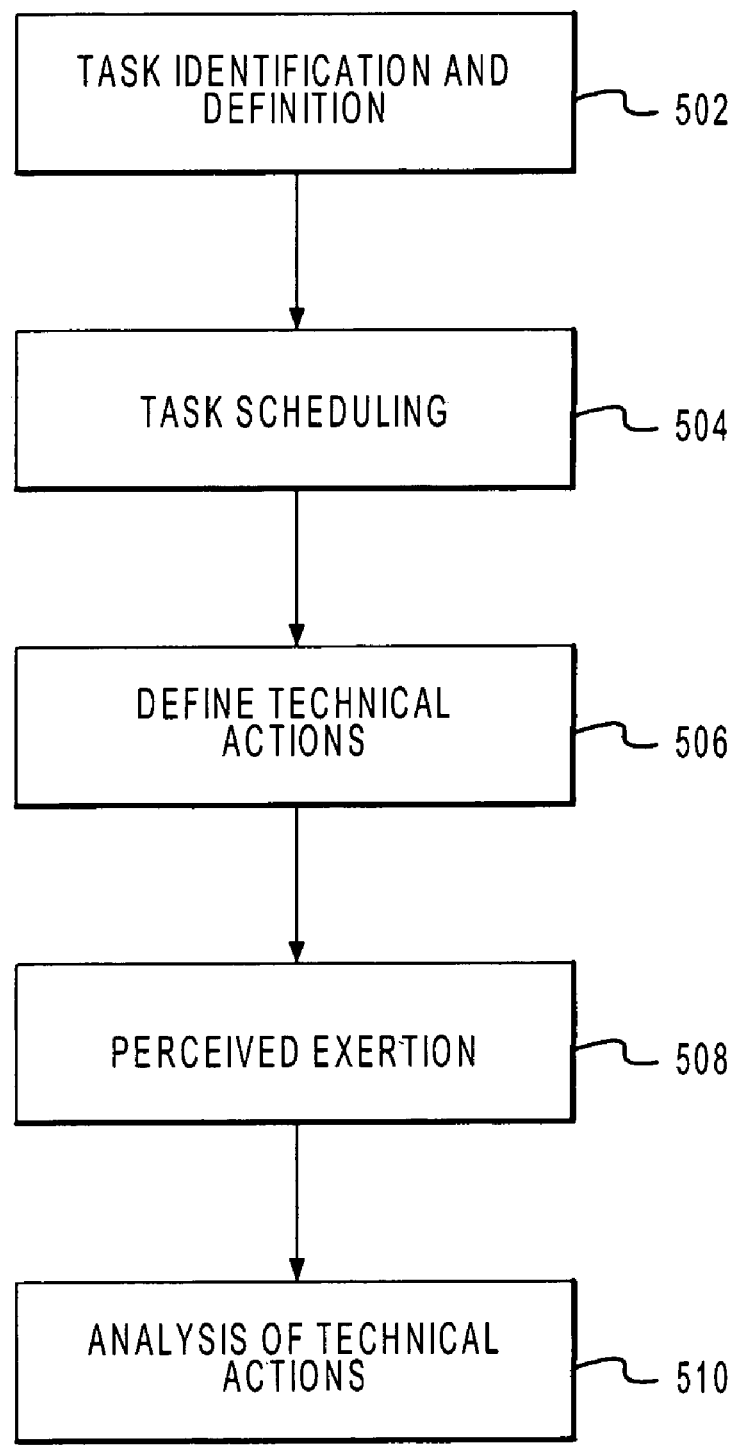
FIG. 5 is a block diagram of an exemplary embodiment of a information identification process in accordance with the present invention.

Continuing in accordance with the present exemplary embodiment, identification step 202 suitably comprises a collection process for obtaining more concise and detailed information in addition to the information described above. For example, for a given ergonomic case, that case can be broken down into a plurality of problems, with each problems being capable of being broken down further into various other levels of components and elements. With reference to FIG. 5, an exemplary embodiment of such a concise identification step 202 is illustrated which includes a plurality of information collecting and identification steps. In accordance with this embodiment, identification step 202 comprises a task identification and definition step 502, a task scheduling step 504, a define technical actions step 506, a perceived exertion step 508, and an analysis of technical actions step 510. However, other embodiments can comprise fewer than these five steps, others can comprise various order combinations of these steps 502 through 510, and other embodiments can comprise additional steps requesting or inquiring into information as described herein.

Task identification and definition step 502 suitably comprises the identification and definition of the basic tasks that comprise a particular job. For example, the end user may provide the identification of the task, such as by providing a task name or identifier. In addition, information indicating whether or not the task is repetitive or non-repetitive, and for repetitive tasks, the duration of an individual cycle, for example, the minimum, average and maximum duration of the repetitive cycle, can be suitably identified. Accordingly, a menu of the various tasks indicative of the repetitive characteristics can be compiled for further use, analysis and assessment.

Task scheduling step 504 suitably comprises the implementing of the tasks into a time framework over the course of the workday. For example, the end user can utilize the menu of tasks from step 502 to suitably build a table indicative of how that end user's time is distributed among the various tasks. The table can comprise a scheduled time block, for example in fifteen, half-hour, or one-our increments. The end user can suitably include the task names within the appropriate time blocks as those tasks are performed during the work day to indicate the order and the duration of those tasks. In addition, for repetitive tasks, the number of cycles, or frequency of cycles, can be suitably indicated.

Define technical actions step 506 suitably comprises the further breaking down of the various repetitive tasks, to the extent any exist, into various technical actions. For example, the end user can break the repetitive tasks down to technical actions comprising lists of "thiarbliags", i.e., verbs that make up a technical action, such as lift, bend, raise and the like, and associated items being acted upon, e.g., boxes, crates, levers, switches, tools and the like. In addition, the end user can indicate the number of repetitions for each technical action, as well as whether the action is conducted on the right or left side of the body, or on both sides of the body.

Figures 4, 7:
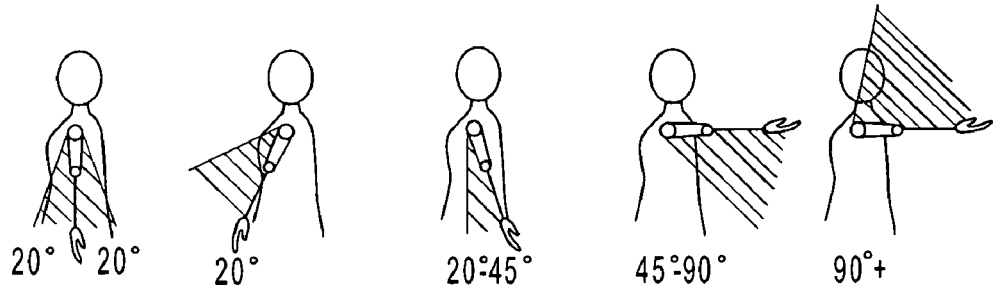
FIG. 4 is an exemplary embodiment of a table of technical actions in accordance with an exemplary embodiment of the present invention.
FIG. 7 is an exemplary embodiment of a graphical display for facilitating the collection of information in accordance with the present invention.

With reference to FIG. 4, an exemplary detailed table as may be derived from definition of technical action step 506 is illustrated. In this example, a repetitive task R-1 such as "cutting of large shells" is suitably identified, and is comprised of various technical actions, such as "place shell on the lathe" and "lower lever" actions among others. In addition, the number of repetitions and the indication of whether the repetitive action occurs on the right side or left side of the employee's body is indicated. In addition, task R-2 and various other tasks as requested can also include detailed information as to technical actions, repetitive cycles and body side location to facilitate further assessment.

Perceived exertion step 508 suitably comprises the definition by the end user of the levels of perceived exertion that are associated with each of the technical actions identified in step 506. Such definition of levels can comprise subjective analysis, and can include the rating of the level of perceived exertion by the end user and the assigning of a numerical value to that perceived level. In accordance with a preferred exemplary embodiment, a Borg's scale value system can be utilized, for example the scale illustrated in FIG. 6 which has a range of exertions ranging from a rating of NOTHING AT ALL to a rating of VERY, VERY STRONG (ALMOST MAXIMUM) over a numerical range of 0 to 10. Thus, in this example, if a perceived exertion level is SOMEWHAT STRONG, a value of 4 can be assigned; if a perceived level is determined to be VERY WEAK, a value of 1 can be assigned. However, it should be noted that step 508 is not limited to the scale illustrated in FIG. 6. For example, various other subjective levels of perceived exertion can be included within the scale, while various of the levels illustrated in FIG. 6 can also be deleted or removed. Further, any scaling system that provides a rating of minimum and maximum levels of perceived exertion can be utilized. In addition to the assessment of the perceived level of exertion, the duration of the exertion can be suitably indicated by the end user. This duration can be displayed in various manners, such as in units of minutes and/or seconds.

Analysis of technical actions step 510 suitably comprises the capture of the detailed movement and positioning data for each task identified in step 502. To facilitate the collection of this information, a survey inquiry can be made that features the job profile information, the task name and the various technical actions. Data and information can be collected that is associated with the various body parts analyzed, such as, for example, the arms, shoulders, wrists and fingers. For example, with reference to FIGS. 8A and 8B, each technical action is suitably identified by body part and side, such as, for example, "Elbow Movements-Right Side." In this example, a display image demonstrating a range of motion can be suitably included to aid the end user in quantifying and/or identifying the range of motion for various body parts, such as supination, pronation and flexion or other ranges of motion, as well as the amount of time that such a range of motion occurs.

In addition to the above assessment of the detailed movement and positioning of the various body parts during the various tasks, in accordance with another embodiment, step 510 can also include a survey regarding activities impacting the lower back region of the body. In this embodiment, the lower back survey comprises a more complex information inquiry than that inquired in step 204, and can include, for example, the starting and ending height of a given lift, the angles of lifting, the positioning of the hands with respect to the given item to be lifted, and other like variables to derive an ideal lifting weight. Additionally, step 510 may comprise the collection and assessment of video data that may be suitably reviewed by consultants or analyzed through automation, such as by digitizing the videotape and mapping a dynamic three-dimensional computer mannequin or the like to the job location.

After obtaining the detailed information from identification step 202, such as provided in steps 502 through 510, a detailed assessment and solution step 206 can be suitably conducted to facilitate a more concise assessment and solution to the ergonomic problem. In step 206, the detailed information collected in step 202 is suitably analyzed to generate various levels of summaries, suggestions and recommendations. For example, a project summary can be provided which describes high-level data about the number of jobs analyzed and which jobs demand or should seek ergonomic attention. The jobs can be listed in the order of exposure, such as by an exposure index determined in step 204, i.e., the job with the most ergonomic risk can be identified first and/or the jobs can be suitably classified into different risk categories based on exposure index values. The detailed information collected for each job task in step 202, such as task description, duration, frequency of repetitions/cycles, total actions and the like, as well as a graphical representation of the daily schedule can also be provided.

From the summary of data provided above, detailed assessments and recommendations can be provided. For example, the discussion of high-level information, such as that obtainable from assessment 203, can be provided along with assessment information regarding exposure levels, such as a detailed explanation of the exposure index found for each body part in assessment 205. Further detailed recommendations can also be provided. For example, to facilitate an understanding of the recommendations, a more detailed explanation of the differences between product recommendations, engineering recommendations and administrative recommendations can be provided.

In accordance with an exemplary embodiment, two sets of recommendations can be provided. The first set comprise more basic recommendations, such as the product recommendations available from assessment step 203. The second set comprises refined recommendations which include engineering and administrative recommendations. These recommendations can be suitably generated from the detailed information through the use of AI engines as described above, such as a rule-based AI engine. If, however, more refined or optimal recommendations are desired in addition to the high-level engineering and administrative recommendations, such as available from assessment step 203, an improved AI engine can be provided.

In accordance with an exemplary embodiment, to provide the more refined or optimal recommendations, step 206 suitably utilizes a case-based AI engine to provide suitable recommendations. The case-based AI engine suitably comprises a case-based reasoning engine which is capable of finding previous cases that approximate or match various of the criteria and information from the currently examined case, and can make similar recommendations. In addition, the case-based engine can become a multi-level analysis by further breaking down the cases into a plurality of problems or components to conduct the matching process, or by breaking down further the problems or components into elements and sub-elements to provide further detailed matching between various elements of other cases. In accordance with another aspect, the case-based engine continues to grow more powerful and effective as the case base continues to grow. For example, as end users more and more frequently use the system and step 206, cases comprising new sets of problems, components and elements may be added to the case database, either in their entirety or selectively, to provide a continually improving AI engine, i.e., a incrementally improving AI engine. Such an adaptive AI engine can be particularly beneficial where the previous knowledge bases corresponded with issues and problems for a given set of demographics, e.g., middle-aged men working groups, and the need for an updated knowledge base is great, e.g., one for older-aged workers and for women. As a result, the AI engine comprises a heuristic process which can build solutions for an evolving set of cases and problems.

Figure 3:
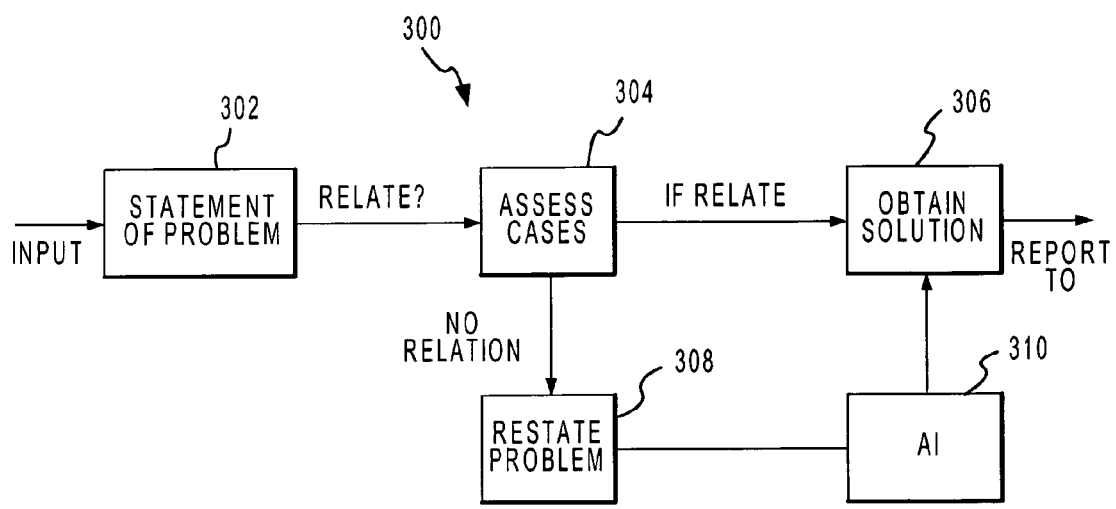
FIG. 3 is a block diagram of an exemplary method for obtaining solutions to a problem in accordance with the present invention.

With reference to FIG. 3, an exemplary method and system 300 for operation of a case-based AI engine is illustrated. In this example, information can be input to system 300 to develop a statement of the problem 302. The statement of the problem step 302 is suitably configured to genericize the input information received during identification and information collecting steps to facilitate the understanding, analysis and assessment by the AI engine. For example, step 302 may review the input information and find appropriately matching key words which provide a generic term or phrase, or step 302 may simply offer the end user various choices of key words to select from when describing the case or problems.

After statement of the problem step 302, the AI system 300 is configured to assess a database of cases in a step 304. The database of cases comprises an ever-growing database of previous cases analyzed by the AI engine, or other engines, and can be configured to add all cases previous addressed or cases suitably selected by an administrator. In addition, for example during start-up of the AI engine, an administrator may "prime" the engine by providing previous cases, such as cases previously analyzed by AI engines, or cases previously resolved by manual operation and analysis. In any event, prior to adding a case, a database administrator can assess whether the case, including the combination of data collected and recommendations provided, should be added to the database. In this regard, the administrator can assess whether the case is redundant, too specialized or otherwise not appropriate.

To assess the database of cases, step 304 can search for previous cases having nearly identical or similar matches within a margin of error. For example, a case having 98% correlation or higher, or for lower level matches, such as greater than 95% correlation between the current data and a previous case or cases can be selected. If a matching correlation is determined, i.e., the current case and a database case relate essentially one to one within the margin of error, the previous solution from the matched case can be provided in step 306, wherein the solution can be suitably reported. However, if no suitable case is identified, the margin of error can be suitably increased, such as to 85%, and then the matching process can be reconducted.

If, however, no current cases have an extremely high level of one-to-one correspondence, or the margin of error is not widened or increased, the AI engine can proceed to a step 308 to restate the current problem. Here, the cases can be broken down into sets of problems, into further sets of components and into further sets of elements or sub-elements. For example, step 308 can be configured to suitably break the problem down into element by body part, or element by motion or activity, such as the level of detail collected in detailed identification step 202. Thus, rather than the matching of a few key terms of a case, a detailed assessment can be conducted in step 310 as to the correlation of various sets of problems, components, elements, functions and activities to find the problems or elements with the highest one-to-one correspondence. For example, step 310 may find a first case that correlates at 70% overall with respect to the current case, but has a first component which correlates highly with respect to upper arm movement set forth in the current case, and a second case that correlates at 60% overall with respect to the current case, but has a second component that correlates highly with respect to repetition and cycles components set forth in the current case. Accordingly, while neither the first case or the second case does not have desirable level of one-to-one match, the combination of the two components can yield a new case having a higher correlation, for example, one having greater than 80%. Thus, step 310 can extract solutions and recommendations from parts of the first and second cases to provide an improved solution in step 306.

In addition, step 310 can derive solutions through other empirical methods, for example, by filing in missing components of information, or deleting or ignoring various pieces of information, if the information does not correlate with previously identified cases having similar features and elements. Further, as a method for verifying the learning process of the AI engine, feedback can be provided by ergonomic consultants and experts as to the recommended solutions in 306, as well as performance or results feedback in the event the end user implements the solutions.

In addition to the product, engineering and administrative recommendations, the prioritization of risks and the summary of information collected, step 206 can also be configured to provide injury cost projections which can calculate and report projected cost savings if various of the recommendations are implemented. The costs projections can be developed through use of exposure rating calculations, such as an exposure index. The cost projections can also include the costs associated with missed work, workman's compensation, and medical and insurance expenses.

Still further, step 206 can also include further information regarding the tracking and reporting of information for the workplace, such as job bench marking, implementation plans, performance and results information and the like. For example, an exemplary job tracking and reporting system may include various of the embodiments and examples described in U.S. Provisional Application No. 60/165,116, entitled "Workplace Tracking and Reporting System", filed on Nov. 12, 1999, having common inventors and assignees, and hereby incorporated by reference herein. In accordance with this aspect, the workplace job assessment system may suitably interface, such as through an Internet Protocol (IP) and the like, to a company's job tracking and reporting system to directly access workplace information and thus facilitate a more dynamic workplace assessment system.

Figure 9:
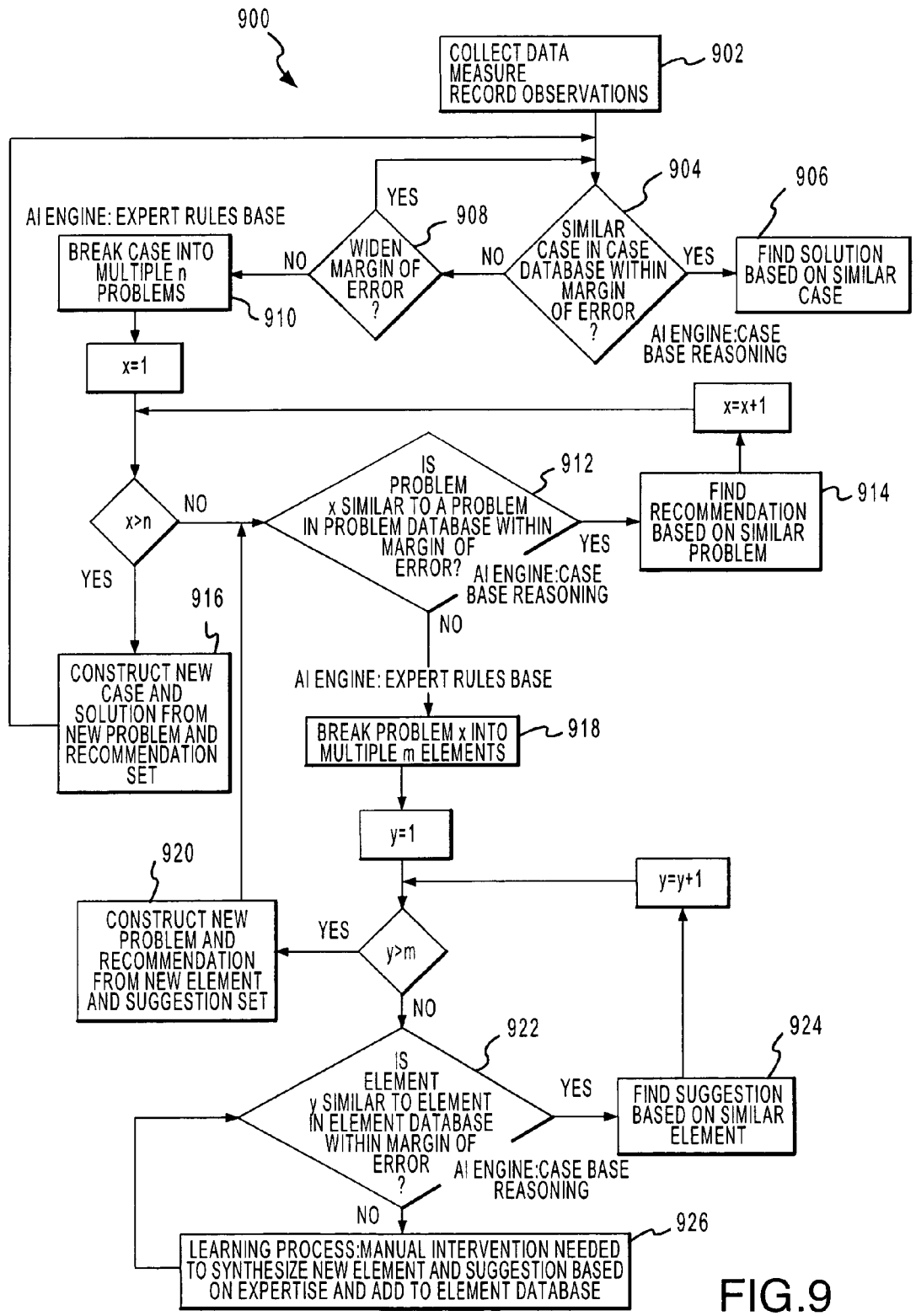
FIG. 9 is a block diagram of an exemplary embodiment for problem solving in accordance with the present invention.

In accordance with another embodiment, the improved AI engine can comprise a multi-level analysis process that is capable of incrementally improving and for providing optimal solutions to cases that have not been encountered on prior occasions, or for creating new cases not yet been encountered at all. In accordance with this exemplary embodiment, with reference to FIG. 9, an improved method for solving cases 900 comprises a step of collecting the data and information 902 within a case, and then determining in step 904 whether a similar case exists in the database, for example, within a margin of error. In the event a similar case is identified in step 904, then a suitable solution can be identified and provided in step 906.

If on the other hand no similar case is found in step 904, method 900 can proceed to widen the margin of error in step 908, and thus consider a larger group of cases for matching in step 904, or directly to step 910. If however, method 900 does not decide to widen the margin of error, then the present case can be suitably broken down into multiple problems or components in step 910. This breaking down of components can be conducted under various methodologies, including, for example, rule-based engines, or by other simplistic or complex algorithms, or by other processes known or later devised. The number n of components or problems broken can comprise any number within a case.

For each problem or component within a case, method 900 can assess in step 912 whether that problem or component is similar or nearly identical to another problem or component within a problem or component database, for example, within a margin of error. If a similar problem or component is identified in step 912, a recommendation based on the similar problem or component can be identified in step 914, and method 900 can return to repeat step 912 until each problem or component has been analyzed. Once each component or problem had been analyzed, method 900 can proceed to construct a new case and solution for the new problem and recommendation set in a step 916. Accordingly, method 900 can continue to build an improved database for solving problems.

In the event that method 900 can not identify a similar problem or case in step 912, method 900 can proceed to a step 918 for further breaking down the problem or component into further m elements. For each element within a problem or component, method 900 can assess in step 922 whether that element is similar or nearly identical to another element within an element database, for example, similar within a margin of error. If a similar problem or component is identified in step 912, a suggestion based on the similar element can be identified in step 924, and method 900 can return to repeat step 922 until each problem or component has been analyzed. In this example, a suggestion comprises the resolution of, or other information associated with, a given element, while a recommendation comprises a set of suggestions. Once each component or problem had been analyzed, method 900 can proceed to construct a new problem and recommendation for the new element and suggestion set in a step 920, and then return to step 912 to re-analyze the given problem. Accordingly, method 900 can continue to build an improved database for solving problems.

In addition, in the event that no similar element is identified in step 922, method 900 can proceed to step 926 for synthesizing new elements and suggestions based on a learning process. This learning process can comprise manual intervention based on expertise, or calculated guesses and/or algorithms designed to combine parts and elements of other problems into a complex whole component or problem set.

In addition, it should be noted that method 900 can further break down into the elements into sub-elements for comparison and identification of other sub-elements within a sub-element database prior to proceeding to step 926. In other words, this breaking down process can suitably continue for multiple levels as is practicable for a given case or problem set. Further, it should be noted that the comparison steps, such as steps 912 or 922, can assess less than all of the problems, components, elements or sub-elements before providing a new problem or a new case or recommendations.

As a result, the improved method 900 can facilitate a heuristic, multilevel process capable of solving various industrial, manufacturing, engineering and business problems, as well as optimizing solutions for the various problems and issues. Moreover, the database of problems and solutions created can be continually improved as more cases are analyzed. For example, as the number of cases continues to grow, the relative margin of error, if utilized, can be suitably reduced. For example, while a process 900 may include a 15% margin of error, as more cases are added to the case database, and thus the probability of finding case matches suitably increases, the margin of error can be suitably reduced, for example to 10% or less, even to the point of elimination.

Regardless of the assessment and solution methodology utilized, the solutions can be suitably communicated to the end users or requesters in various forms. For example, written reports providing the information can be suitably provided by the system. However, in accordance with another aspect of the present invention, the solutions and recommendations provided by method and system 200 can be configured in a manner that facilitates efficient access and real-time response systems to the various problems and issues of end users.

Figure 10:
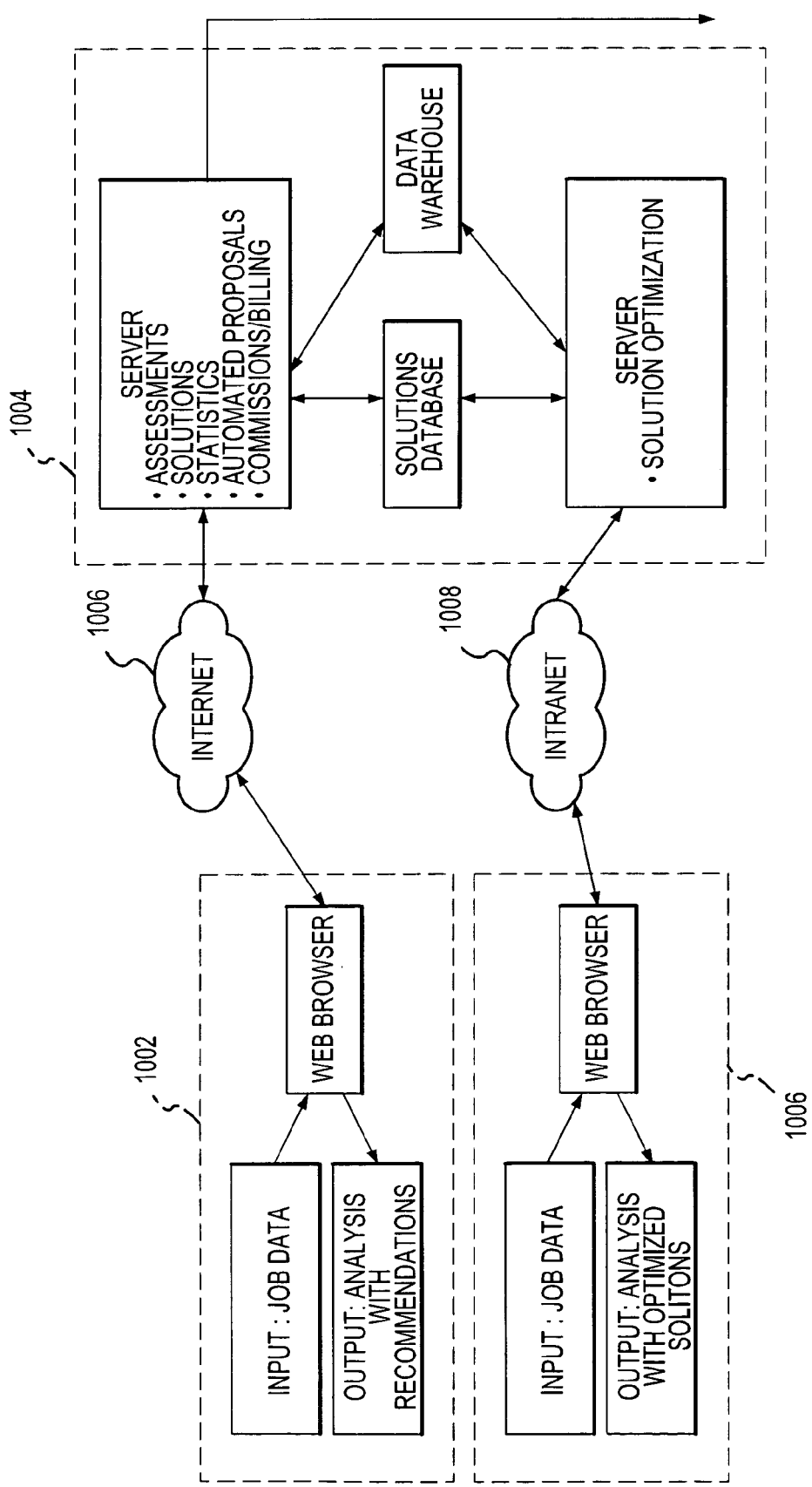
FIG. 10 is an exemplary embodiment of a system for practicing the method in accordance with the present invention.

In accordance with an exemplary embodiment, the information collected in inquiry 104 can be suitably communicated through a network to a server including the knowledge base 106. With reference to FIG. 10, an assessment system, such as an ergonomic risk assessment system, can include a client interface 1002 and an assessment system 1004. Users of the client interface 1002, such as company health and safety employees, insurance personnel and the like, can suitably connect through communication links, such as an Internet Protocol (IP) connection 906 and the like, to an assessment system 904, which can comprise one or more servers and processors.

The client interface 1002 is configured to facilitate the input of various information via a user interface, such as by using a common Internet browser, for example, Netscape Navigator or Microsoft Internet Explorer, through a communication link, into the IP network 1006 for receipt by assessment system 1004. Client interface can also comprise any computer or microprocessor configuration. As a result, end users can gain real-time access to new solutions and up-to-date analysis and tracking techniques without the need for distribution of software updates and modifications.

Assessment system 1004 may be located at the consultant's location, such as, for example, an ergonomic headquarters, such that the information and assessment reports and recommendations can be readily altered, updated and modified as desired. Assessment system 1004 can be configured to provide solutions as developed by methods 200, 300, and 900 and the various other exemplary embodiments as described above. Further, assessment system 904 can comprise one or more servers, as well as database storage devices.

Various other embodiments of the system may also be provided in order to implement analysis automation. For example, assessment system 1004 can include a server which can communicate via various communication links, such as an Internet, Intranet or any other like communication protocol, to a facilitator 1006, such as an ergonomic facilitator. Moreover, an additional module can be provided to the server, such as, for example, one to automate the processing of the videotape recorded at the job site. Accordingly, by digitizing the videotape and mapping a dynamic three-dimensional computer mannequin or the like to the job location, the job analysis can be completely automated.

In accordance with the exemplary embodiment for ergonomic analysis, additional modules can be developed to provide advanced analysis to be incorporated into the server as additional features, including, for example, NIOSH Lifting Analysis Modules, Biomechanical Analysis Modules, Cost/Benefit Analysis Modules, Industrial Hygiene Modules, Work Measurement Analysis Modules, Job Safety Assessment Module, Occupational Medicine Module, Federal Regulatory Information Modules, Computer Based Training in Ergonomics, Functional Capacity Assessment Modules. These modules can be provided as optional features depending on a client's needs. These add-on modules can enable companies to perform advanced analysis and facilitate linking to industrial hygiene, industrial engineering and health and safety systems.

The present invention has been described above with reference to an exemplary embodiment. However, those skilled in the art will recognize that changes and modifications may be made to the exemplary embodiment without departing from the scope of the present invention. For example, the various processing steps dictated by the software, as well as the components for carrying out the processing steps, may be implemented in alternate ways depending upon the particular application or in consideration of any number of cost functions associated with the operation of the system, e.g., various of the steps may be deleted, modified, or combined with other steps. In addition, it should be noted that the improved AI engine is applicable to any industrial, manufacturing, engineering or business case or problem, and is not limited to use with an ergonomic system. Further, the assessment server may comprise a single server or a plurality of servers configured to function as described above. Additionally, the assessment system may include various language translators to facilitate operation within various foreign language countries. Moreover, the various communication links between servers, interfaces, modules or other system devices are not limited to Internet Protocol (IP) and may comprise any other communication protocol now known or hereinafter devised. These and other changes or modifications are intended to be included within the scope of the present invention, as set forth in the following claims.

We claim:

1. An ergonomic solution system for facilitating reduction of ergonomic injuries in a workplace, said system comprising:
    a computerized issue component for identifying ergonomic risk issues to be resolved;
    a computerized inquiry component for facilitating collection of workplace information relevant to said computerized issue component to facilitate definition of said computerized issue component;
    a knowledge database comprising ergonomic data and information for facilitating assessment of said workplace information;
    a solution database for compiling ergonomic assessments and recommendations from said knowledge database and for reporting said assessments and said recommendations to the workplace; and
    a communications network for communicating said workplace information to said knowledge database and for communicating said ergonomic assessments and recommendations to the workplace for implementation.

2. An ergonomic solution system according to claim 1, wherein said knowledge database comprises an artificial intelligence engine for assessing said workplace information, said artificial intelligence engine configured for comparing a current ergonomic issue with an existing ergonomic issue within a said knowledge database to determine if similar, and thus provide a recommendation consistent with said existing ergonomic issue, and for breaking down said current ergonomic issue into smaller ergonomic components for further comparison if said existing ergonomic issue is not similar to said current ergonomic issue to thus provide a suggestion associated with said smaller ergonomic components.

3. An automated method for reducing ergonomic injuries in the workplace, said automated method comprising the computer-implemented steps of:
   identifying an ergonomic issue occurring at a client workplace, said ergonomic issue being provided by a client through a computerized client interface;
   collecting client information from the client through the computerized client interface, said information relevant to said ergonomic issue and configured to further define said ergonomic issue;
   assessing said client information with a computerized artificial intelligence engine by comparison of said client information to previous client information from previous ergonomic issues stored within a knowledge database;
   selecting recommendations stored within a solution database for resolving said ergonomic issue, said recommendations based on previous ergonomic issues having similarity to said client information; and
   providing said recommendations through a communications network to the client, through said client interface.

4. An automated method according to claim 3, said data processing method further comprising the computer-implemented step of:
   prioritizing ergonomic risks determined from said steps of collecting information and assessing said information.

5. An automated method according to claim 3, said step of collecting client information comprising the computer-implemented steps of:
   identifying a plurality of tasks comprising a corresponding job provided by the client through said client interface;
   scheduling said plurality of tasks into a time framework to identify repetitive tasks;
   defining technical actions of any repetitive tasks as determined by said time framework configured with said plurality of tasks;
   identifying a perceived exertion value associated with said repetitive tasks; and
   analyzing said technical actions by capturing movement and positioning data associated with said repetitive tasks.

6. An automated method according to claim 3, wherein said step of assessing comprises the computer-implemented steps of:
   defining an issue statement corresponding to said client information to facilitate assessment by said computerized artificial intelligence engine; and
   assessing said issue statement with said computerized artificial intelligence engine by comparison of said issue statement to said previous ergonomic issues stored within said knowledge database to identify at least one previous ergonomic issue substantially similar to said issue statement;
   providing said recommendation for said ergonomic issue corresponding to a previous recommendation to said at least one previous issue in the event that said at least one previous issue has information substantially similar to said ergonomic issue; and
   redeveloping said issue statement to further break down said issue statement into detailed elements to facilitate identification of previous detailed elements of said previous ergonomic issues stored within said knowledge database and being similar to said detailed elements of said issue statement in the event that said at least one previous issue is not substantially similar to said ergonomic issue; and
   providing a new recommendation with said computerized artificial intelligence engine based on said previous detailed elements of a plurality of said previous ergonomic issues to define a new ergonomic issues having substantial similarity to said ergonomic issue.

7. An automated method according to claim 6, wherein said steps of collecting information relevant to said ergonomic issue and assessing said information collected to provide recommendations comprise communicating said information and said recommendations over a network.

8. An automated method for providing recommendations to engineering and business cases, said method comprising the computer-implemented steps of:
   collecting data through a client interface relating to at least one case of a client;
   determining through a computerized artificial intelligence engine whether an existing case in a knowledge database is substantially similar to said at least one case, and providing a solution corresponding to at least one existing case if said case in said database is substantially similar to said at least one case;
   breaking down said at least one case into multiple problems if at least one said existing case in said knowledge database is not substantially similar to said at least one case of the client; and
   assessing through said computerized artificial intelligence engine at least one of said multiple problems to determine whether an existing problem within said knowledge database is substantially similar to said at least one of said multiple problems, and providing a recommendation corresponding to said existing problem if said existing problem in said knowledge database is substantially similar to said at least one of said multiple problems.

9. An automated method according to claim 8, wherein said method further comprises the computer-implemented step of assessing through a computerized artificial intelligence engine each of said multiple problems to determine whether at least one existing problem in said knowledge database is substantially similar to any of said multiple problems, and providing a recommendation corresponding to any existing problems that are substantially similar to any of said multiple problems.

10. An automated method according to claim 8, wherein said step of determining whether an existing case in said knowledge database is substantially similar to said at least one case comprises the computer-implemented step of assessing with said computerized artificial intelligence engine whether said existing case within said knowledge database is similar to said at least one case within a margin of error.

11. An automated method according to claim 10, wherein said margin of error is widened by said computerized artificial intelligence engine to a new range if said case in said knowledge database is not similar to said at least one case within an original range of said margin of error.

12. An automated method according to claim 10, wherein said margin of error is reduced by said computerized artificial intelligence engine as additional cases are stored within said knowledge database and additional solutions are provided.

13. An automated method according to claim 8, wherein said step of assessing at least one of said multiple problems comprises the computer-implemented step of assessing whether at least one of said existing problems in said knowledge database is similar within a margin of error to said at least one of said multiple problems.

14. An automated method according to claim 9, wherein said method further comprises the computer-implemented steps of:
- breaking down said at least one of said multiple problems into multiple elements if any of said existing problems in said knowledge database are not similar to said at least one of said multiple problems; and
- assessing at least one of said multiple elements to determine whether an existing element in said knowledge database is substantially similar to said at least one of said multiple elements, and providing a recommendation corresponding to said existing element if said existing element in said knowledge database is substantially similar to said at least one of said multiple elements.

15. An automated method according to claim 8, wherein said method further comprises the computer-implemented step of:
- constructing a new case and solution set from said recommendation corresponding to said at least one of said multiple problems.

16. An ergonomic assessment system for facilitating automated assessment and solutions for reducing ergonomic issues, said ergonomic assessment system comprising:
- a documented issue statement completed by a client through a computerized client interface, said documented issue statement configured for identifying problems to be resolved;
- an inquiry component for facilitating collection of client information provided by the client through said client interface, said client information utilized with said documented issue statement to facilitate further definition of said documented issue statement;
- a knowledge database comprising data and information relating to previous issues provided by clients, said knowledge database configured for facilitating assessment of said client information by comparison to said previous issues provided by clients;
- a solution database comprising previous recommendations associated with said previous issues, said solution configured for compiling assessments from said knowledge base and for providing a new recommendation based on comparison conducted by said knowledge database; and
- an electronic communications network for communicating said client information from said inquiry component to said knowledge database, and for communicating said new recommendation from said solution database to the client through said client interface.

17. A system according to claim 16, wherein said knowledge database comprises a computerized artificial intelligence engine for assessing said client information, said computerized artificial intelligence engine configured for comparing client information defining said documented issue statement with previous client information relating to said previous issues to determine similarity, and thus provide said recommendation being associated with sufficiently similar previous issues, and for breaking down said issue statement into smaller components for further comparison if said previous issues are not sufficiently similar to said documented issue statement, and then provide a new recommendation associated with said smaller components sufficiently similar to said previous issues.

18. An ergonomic assessment system according to claim 17, wherein said computerized artificial intelligence engine assesses whether a said documented issue statement is similar to a previous documented issue statement within said knowledge database within a margin of error.

19. The ergonomic assessment system according to claim 18, wherein said margin of error is widened by said computerized artificial intelligence engine to a new range if said previous documented issue statement and said knowledge database is not similar within an original range of said margin of error.

20. The ergonomic assessment system according to claim 18, wherein said computerized artificial intelligence engine breaks down said client information into multiple problems for comparison to previous recommendations from said solution database to determine if similar, and further breaking down said multiple problems into multiple elements if said recommendations are not similar to at least one of said multiple problems.

\* \* \* \* \*